F. MAREK.
CORNUCOPIA DISPENSER.
APPLICATION FILED APR. 5, 1919. RENEWED MAR. 29, 1920.
1,339,067.
Patented May 4, 1920.
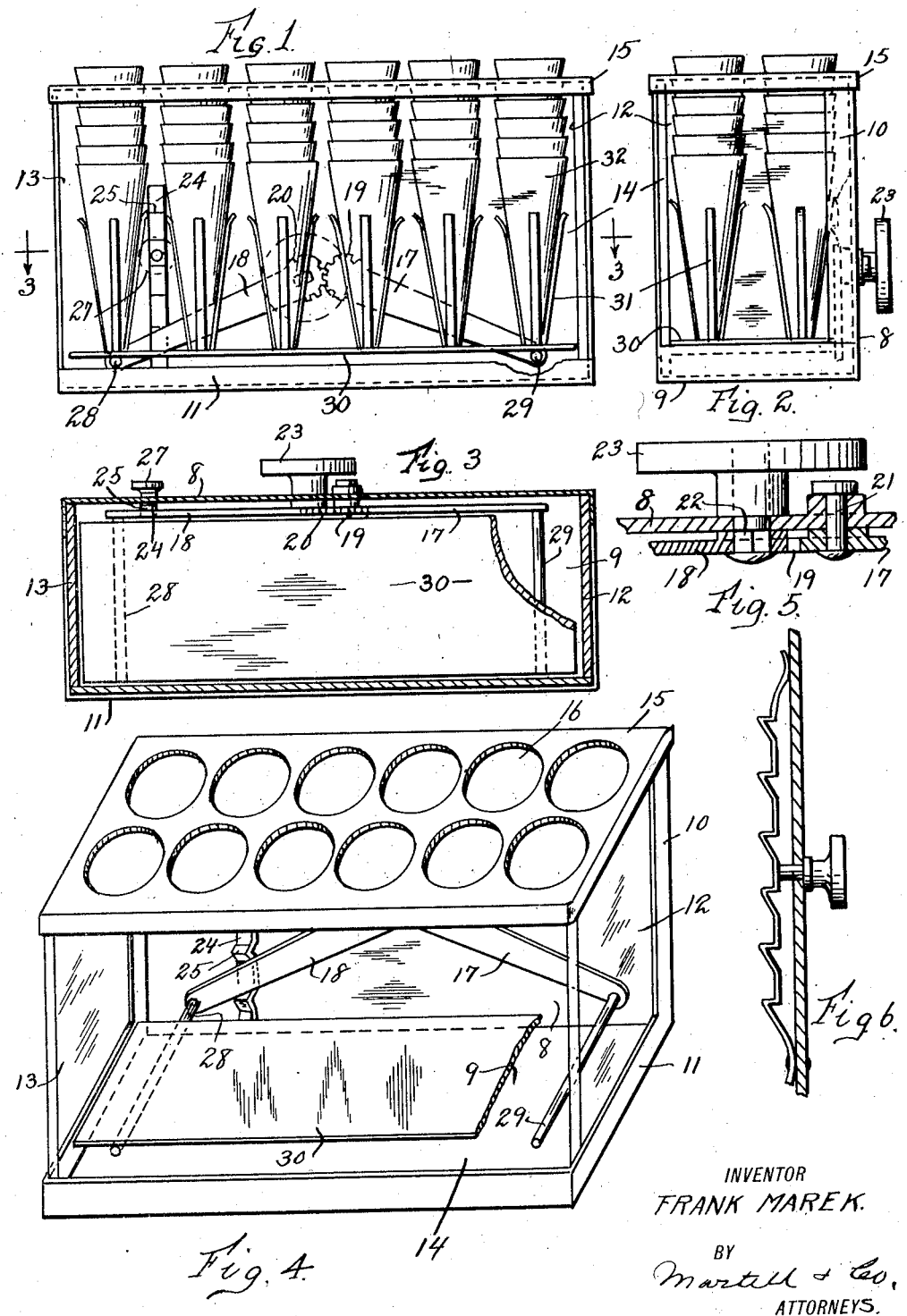
INVENTOR
FRANK MAREK.
BY
Martell & Co.
ATTORNEYS.

United States Patent Office.

FRANK MAREK, OF LOS ANGELES, CALIFORNIA.

CORNUCOPIA-DISPENSER.

1,339,067.  Specification of Letters Patent.  Patented May 4, 1920.

Application filed April 5, 1919, Serial No. 287,762. Renewed March 29, 1920. Serial No. 369,766.

*To all whom it may concern:*

Be it known that I, FRANK MAREK, a citizen of Austria, who has declared his intention of becoming a citizen of the United States, and resident of Los Angeles, in the county of Los Angeles, State of California, have invented certain new and useful Improvements in Cornucopia-Dispensers, of which the following is a specification.

My invention relates primarily to a device for dispensing cornucopias and the like ordinarily filled with ice cream and the object thereof is to provide a device which will avoid unnecessary handling.

Another object is to provide a device of the above character which will act as a display case as well as a dispenser, which will avoid all handling excepting by the purchaser and which will be cheap, simple, efficient and attractive in appearance.

Other objects and advantages will appear hereinafter and while I have shown and will describe the preferred form of my invention it will be understood that I do not limit myself to such preferred form, but that various changes and adaptations may be made therein without departing from the spirit of my invention.

In the drawings accompanying and forming a part of this application:

Figure 1 is a front elevation of my device ready for use.

Fig. 2 is a side elevation of Fig. 1.

Fig. 3 is a section on the line 3—3 of Fig. 1, with parts omitted for clearness of illustration.

Fig. 4 is a perspective view of my device partly broken away.

Figs. 5 and 6 are details of construction enlarged.

Referring to the drawings my device comprises an outer casing, the rear and bottom walls 8 and 9 of which are of metal and are provided with narrow right angle flanges 10 and 11. The side walls 12 and 13 and the front wall 14 are preferably formed of glass or the like transparent material. The flanges 10 and 11 serve to retain walls 12, 13 and 14 in their operative position. A cover 15 provided with apertures 16 therein serves as a closure for the upper end of the case. Pivotally mounted in the rear wall 8 near the center thereof are the lifting arms 17 and 18 the upper ends of which are provided with gear teeth 19 and 20 which mesh together whereby said arms always travel in unison, arm 17 being pivoted by pivot 21 to said rear walls and arm 18 being rigidly secured to the end of a pivot 22 projecting through said wall, a knob 23 on the outer end of said pivot 22 serving as means to rotate said arms. Secured at its lower end to rear wall 8 near one end thereof is a holding member 24, preferably formed of spring steel bent to form a series of steps 25. Secured to said spring 24, intermediate its length, is an operating stud 26 the free end of which extends through wall 8 and terminates in a knob or button 27. Extending outwardly from the free ends of arms 17 and 18 are lifting rods 28 and 29 which extend substantially the width of the case and have resting thereon a rectangular shelf 30 and extending upwardly from shelf 30 are a plurality of cone-shaped retaining members 31 in which are mounted the cornucopias 32, said cornucopias being nested one within the other until the topmost one extends sufficiently beyond the top of cover 15 to enable the purchaser to grasp the same with his hand.

In the use of our device in dispensing ice cream cones the device will be in the positions shown in Figs. 1 and 2. When a call is made for an ice cream cone the topmost row of cones is first filled by the operator and the purchaser allowed to help himself. When the topmost row has all been used knob 23 is operated to rotate arms 17 and 18 and elevate rods 28 and 29. Rods 28 and 29 will elevate shelf 30 and with it the rows of cones 32, steps 25 being so proportioned as to hold arms 17 and 18 elevated the desired amount to allow the cones to project the required distance above the top of cover 15. When the case is empty knob 27 is drawn out thereby releasing arms 17 and 18 and permitting them to return to the starting point. A new supply of cones is positioned in the case and the device is then ready for use.

Having described my invention what I claim is:

1. A cornucopia dispenser comprising a casing provided with a plurality of vertically extending rows of cornucopias therein and means to raise said rows upwardly whereby the topmost ones in each row will be caused to extend beyond the top of said casing; means to adjust said last means; means to release said adjusting means.

2. A cornucopia dispensing device comprising a substantially rectangular casing; a detachable cover for said casing; a pair of arms pivotally mounted at one end in the rear wall of said casing to extend parallel therewith within the casing, the pivoted ends of said arms being provided with gear teeth which mesh together whereby said arms are caused to travel in unison; a rod extending from the free end of each of said arms at a right angle thereto; a shelf mounted on said rods to move therewith; a plurality of vertically extending cone-shaped holders mounted on said shelf; and a flexible step-shaped retaining member mounted in the rear wall of said casing adapted to hold said arms in their adjusted position.

In witness that I claim the foregoing I have hereunto subscribed my name this 27th day of March, 1919.

FRANK MAREK.